June 16, 1925.

W. F. HUTHER 1,542,300

ROLLER BEARING STRUCTURE

Filed Jan. 10, 1923

Inventor
W. F. Huther,
By A. B. Foster,
Attorney

Patented June 16, 1925.

1,542,300

UNITED STATES PATENT OFFICE.

WILLIAM F. HUTHER, OF CANTON, OHIO.

ROLLER-BEARING STRUCTURE.

Application filed January 10, 1923. Serial No. 611,911.

*To all whom it may concern:*

Be it known that I, WILLIAM F. HUTHER, a citizen of United States of America, residing at Canton, Ohio, have invented new and useful Improvements in Roller-Bearing Structures, of which the following is a specification.

This invention relates to bearings, and has special reference to roller bearings of the type in which frusto-conical rollers are employed, the bearings being designed primarily as radial bearings, but being so arranged as to also act as end thrust bearings.

One important object of the invention is to provide an improved general construction of bearings of this character.

A second important object of the invention is to provide improved means for retaining the rollers of the bearings in position between the annular members common to such bearings.

A third important object of the invention is to provide a bearing of this character having an improved cage arrangement.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1:
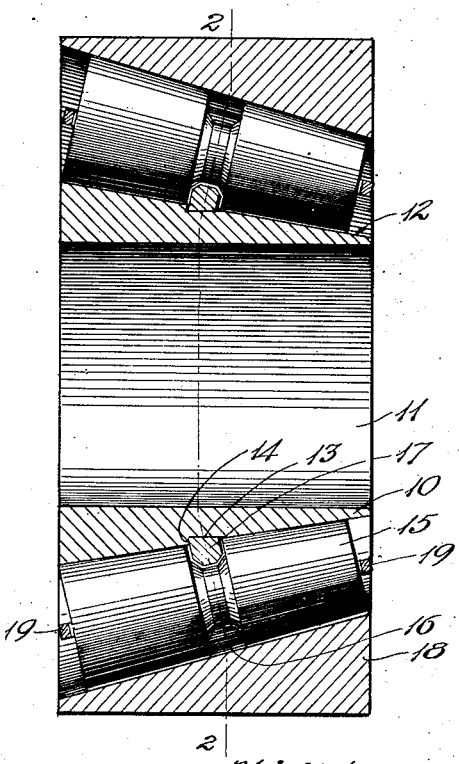
Fig. 1 is a section taken diametrically through one form of the improved bearing.

In the embodiment of the invention shown in Fig. 1, it will be seen that there is provided an inner annular member 10 which is usually termed the cone or inner race. This member 10 is provided with a bore 11 for the reception of the shaft, axle or the like, which is intended to be supported in the bearing, and this bore may be cylindrical or frusto-conical as desired to accommodate the particular portion of the shaft on which this member is fitted in use. The exterior of the member 10 has a frusto-conical surface 12 which is interrupted about the center of the length of this member by a groove having a bottom 13 and a shoulder 14, the bottom extending from the smaller end of the frusto-conical exterior to the shoulder 14, which is preferably at right angles to the bottom, the latter being parallel to the axis of the piece so that this bottom forms a cylindrical portion in the middle of the frusto-conical exterior. Resting on the frusto-conical surface 12 is a series of frusto-conical rollers, each of which is indicated at 15. Each of these rollers is provided intermediate its ends with an annular groove 16, which is here shown as of half octagonal form, although any form that may be preferred can be used. This groove is so positioned centrally of the rollers 15 that the portion adjacent the member 10 lies opposite the cylindrical grooves in said member. At 17 is shown the retaining ring, which has a cylindrical inner surface of such size that it will grip solidly on the cylindrical groove of the member 10 when in position. This ring preferably has its internal diameter slightly less than the diameter of the member 10 at the bottom of the groove 13, so that it may be either forced into position, as by hydraulic pressure, or may be expanded by heat and shrunk on to the exterior of the cone 10. The outer part of the ring 17 is made to conform to the grooves 16 in the several rollers 15 so that when these rollers are in position, the ring 17 holds the rollers 15 from longitudinal movement. Outside of the rollers 15, there is provided an outer race or cup 18, which has a cylindrical exterior to fit in the supporting casting, while the interior of the member is formed with a frusto-conical bore to form a rolling surface for the rollers 15.

Figure 2:
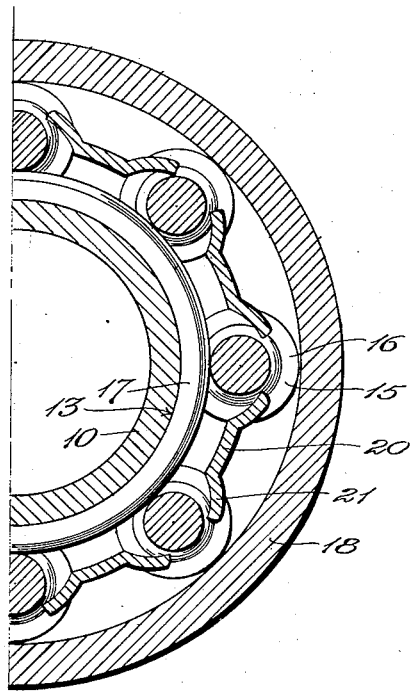
Fig. 2 is a half section taken on the line 2—2 of Fig. 1.

These rollers are held in spaced relation around the bearing by means of a cage consisting of a pair of annular end members 19, which are connected by longitudinally extending bars 20, each having centrally located fingers 21 projecting from its opposite sides and engaging in the respective grooves 16, these fingers being curved and having their ends overlapping the shank portion 22 of each roller so as to hold the rollers in position. Thus this cage forms an annular structure with the longitudinal portions 20 separating adjacent rollers. It will be observed in Fig. 2, that the entire bearing, as shown, contains but eight of the rollers 15. However, this number of rollers will of course be increased or decreased in order to suit the particular bearing, and in the present instance, the number has been shown as less than that which will generally be used, this being for the purpose of bringing out more clearly the distinctive arrangement of the parts, and it is not to be understood that I am limited to any particular number.

Figure 3:
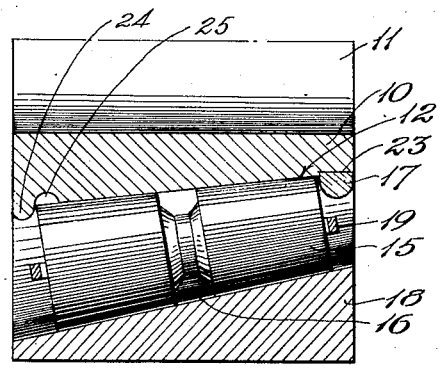
Fig. 3 is a detail section showing a modified arrangement of the roller retaining means, the section showing only one-half of the bearing.
Figure 4:
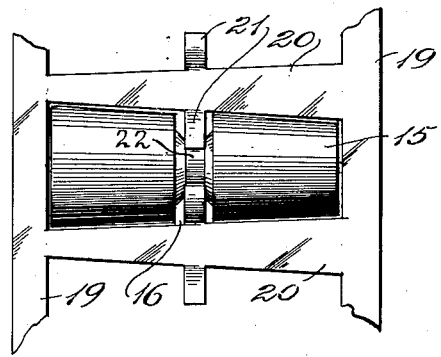
Fig. 4 is a detail view showing the arrangement of cage.

In the modification shown in Fig. 3, all of the parts are like the form shown in Fig. 1 except the inner race or cone, which in this instance, has an anuular portion 23 formed at its smaller end, and a retaining rib 24 formed at its larger end, an oil groove 25 being provided adjacent this rib 24. The ring 17 in this case is fitted onto the cylindrical portion 23 and serves to prevent movement of the rollers in one direction only, the rib or flange 24 preventing movement in the opposite direction.

It will be seen that in each of these forms one of the distinctive characters of the device resides in the employment of the detachable or separate ring 17 which is positioned on the cone to form a rib thereon, being preferably held in position by frictional engagement such as is produced by a forced fit or shrinking.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

The member 10 can be pressed from steel tubing, which greatly simplifies the construction of the same.

Having thus described the invention, what is claimed as new, is:

1. In a roller bearing, an inner member having a frusto-conical exterior and provided with a short cylindrical portion dividing the member into minor and major frusto-conical ends, a roller retaining ring frictionally engaged on said cylindrical portion said minor end forming a guide and expanding means for the ring, said ring being a continuous unbroken annulus, rollers surrounding the inner member and engaging against the side of said retaining ring whereby longitudinal movement of said rollers is prevented, and an outer member having a frusto-conical interior surrounding said rollers.

2. In a roller bearing, an inner cone having a frusto-conical exterior interrupted between its ends by a cylindrical portion dividing the member into minor and major frusto-conical ends merging at one side into the frusto-conical exterior and having at its opposite side a shoulder, a roller retaining ring mounted on said cylindrical portion and held thereon by strong frictional engagement said minor end forming a guide and expanding means for the ring, said ring being a continuous unbroken annulus, a series of rollers surrounding said cone and each having a groove intermediate its ends engaging said retaining ring, and an outer cup engaging over on said rollers.

3. In a roller bearing, an inner cone having a frusto-conical exterior interrupted between its ends by a cylindrical portion dividing the member into minor and major frusto-conical ends and merging at one side into the frusto-conical exterior and having at its opposite side a shoulder, a roller retaining ring mounted on said cylindrical portion and held thereon by strong frictional engagement said minor end forming a guide and expanding means for the ring, said ring being a continuous unbroken annulus, a series of rollers surrounding said cone and each having a groove intermediate its ends engaging said retaining ring, an outer cup engaging over on said rollers, and a spacing cage wherein said rollers are mounted, said cage including longitudinally extending members arranged between adjacent rollers and having finger portions projecting into the grooves of the rollers.

In testimony whereof I affix my signature.

WILLIAM F. HUTHER.